United States Patent
Lapaille et al.

(10) Patent No.: US 7,042,966 B1
(45) Date of Patent: May 9, 2006

(54) METHOD OF ESTIMATING THE SIGNAL-TO-NOISE RATIO IN A TELECOMMUNICATIONS RECEIVER AND AN APPLICATION OF THE METHOD TO CONTROLLING A TRANSMITTER

(75) Inventors: Cédric Lapaille, Chatou (FR); Guillaume Calot, Le Chesnay (FR)

(73) Assignee: Alcatel, Paris (FR)

( * ) Notice: Subject to any disclaimer, the term of this patent is extended or adjusted under 35 U.S.C. 154(b) by 703 days.

(21) Appl. No.: 09/786,553

(22) PCT Filed: Jul. 6, 2000

(86) PCT No.: PCT/FR00/01943

§ 371 (c)(1),
(2), (4) Date: Mar. 7, 2001

(87) PCT Pub. No.: WO01/05073

PCT Pub. Date: Jan. 18, 2001

(30) Foreign Application Priority Data

Jul. 8, 1999 (FR) .................................... 99 08842

(51) Int. Cl.
 *H03D 1/04* (2006.01)
 *H03K 9/00* (2006.01)
(52) U.S. Cl. ...................... 375/346; 376/316; 376/147
(58) Field of Classification Search ................ 375/227, 375/295, 316, 346, 147; 455/561
See application file for complete search history.

(56) References Cited

U.S. PATENT DOCUMENTS

| | | | | |
|---|---|---|---|---|
| 4,835,790 A | * | 5/1989 | Yoshida et al. | 375/227 |
| 5,301,364 A | * | 4/1994 | Arens et al. | 455/69 |
| 5,440,582 A | * | 8/1995 | Birchler et al. | 375/227 |
| 5,559,790 A | * | 9/1996 | Yano et al. | 370/342 |
| 5,719,898 A | * | 2/1998 | Davidovici et al. | 375/130 |
| 5,809,065 A | * | 9/1998 | Dapper et al. | 375/216 |
| 5,809,090 A | * | 9/1998 | Buternowsky et al. | 375/347 |
| 5,918,184 A | * | 6/1999 | Wang | 455/561 |

FOREIGN PATENT DOCUMENTS

EP 0 589 595 A2 3/1994

* cited by examiner

*Primary Examiner*—Chieh M. Fan
*Assistant Examiner*—Jason M. Perilla
(74) *Attorney, Agent, or Firm*—Sughrue Mion, PLLC

(57) ABSTRACT

A method for estimating a signal-to-noise ratio, in particular digital, received by a radio communication receiver. The method includes estimating separately the signal and the noise and filtering (36, 44) separately the signal ($E_b$) and the noise ($N_0$) before carrying out the division (40) of the signal from the noise. The noise filtering is for example of the statistical type, whereas the signal filtering is of the low-pass filtering type.

10 Claims, 1 Drawing Sheet

METHOD OF ESTIMATING THE SIGNAL-TO-NOISE RATIO IN A TELECOMMUNICATIONS RECEIVER AND AN APPLICATION OF THE METHOD TO CONTROLLING A TRANSMITTER

This application is the national phase of international application PCT/FR00/01943 filed Jul. 6, 2000 which claims priority to French application 99 08 842 filed Jul. 8, 1999.

BACKGROUND OF THE INVENTION

The invention relates to a method of estimating the signal-to-noise ratio of a signal received by a radiocommunications receiver. It also relates to a receiver for implementing the method and to an application of the method to controlling the power of a transmitter.

A telecommunications system generally transmits a large number of different calls simultaneously.

By way of example, the telecommunications system considered herein is one in which terminals communicate with a control or connection station, in particular via retransmission means on a satellite. Calls between terminals are effected via the control station. The control station therefore communicates simultaneously with a set of terminals.

In the above telecommunications system, the number of calls that can be transmitted simultaneously depends on the retransmission power available on the satellite. To maximize the capacity of the system, in other words to maximize the number of calls that can be transmitted simultaneously, it is necessary to minimize the power allocated to each transmitter, because the retransmission power is necessarily limited. However, this constraint is difficult to reconcile with the requirement to optimize call quality, which requires sufficient transmission power. As a general rule, the calls are digital calls and transmission quality is assessed against a maximum permitted error rate. The permitted error rate is guaranteed if the received signal-to-noise ratio is above a pre-determined threshold.

Thus the power of a transmitter is generally determined from the signal-to-noise ratio measured at the associated receiver and the signal-to-noise ratio is generally measured continuously, in particular in a satellite transmission system, because propagation conditions can vary, in particular because of variations in meteorological conditions. For example, rain causes strong attenuation of the received signal compared to transmission in fine weather. Propagation conditions can also be degraded by scintillation due to multiple signal paths causing additive and subtractive combination of signals. Propagation conditions can also be degraded because of masking when an antenna is tracking a mobile source (here the satellite) and obstacles block the path of the transmitted signal.

The measured signal-to-noise ratio of a received signal is itself generally subject to estimation noise and the measurements are usually smoothed, for example by low-pass filtering, to reduce the estimation noise.

The accuracy of the measured signal-to-noise ratio determines the capacity of the telecommunications system. If the measurement is accurate, each transmitter is allocated just the necessary power, which therefore maximizes the communications resources, whereas an inaccurate measurement leads to the allocation of too much power to each transmitter, which is not favorable to maximizing communications capacity.

SUMMARY OF THE INVENTION

The invention improves the accuracy of the estimated signal-to-noise ratio and thus supplies a set point signal to the associated transmitter which minimizes the power it transmits.

To this end, the invention estimates the signal and the noise separately and the signal and the noise are filtered separately before dividing signal by noise. It has been found that filtering each component separately prior to division reduces the estimation noise.

In one embodiment, the signal and the noise are filtered differently, preferably in ways that are respectively suited to the signal and to the noise. The signal and the noise are variables of different kinds, in particular because of their different physical origins, and so a form of processing suited to one of the variables is not necessarily suited to the other one, for example, because their amplitudes and frequency bands are usually very different.

Also, when the traffic is sporadic, the power of the signal can be estimated only when data signals are present, although noise can be measured continuously.

A low-pass filter is preferably used to filter the wanted signal prior to division, on the one hand to achieve a significant reduction in the signal estimation noise and on the other hand to achieve a sufficiently short control loop response time. To this end, either a finite impulse response filter is used, for example an averaging filter, or an infinite impulse response filter is used, for example a first order filter. A first order infinite impulse response filter is preferable in the case of sporadic traffic because it gives more weight to more recent data than to less recent data.

Statistical smoothing that allows for the random nature of the noise is preferably used to filter or smooth the noise estimate. To this end, the statistical distribution of the noise power measurements is observed over a particular period chosen to be long enough to collect a large (statistically representative) number of measurements but such that the noise retains a static behavior during that period. A noise level above the average value is then chosen to constitute a limit value beyond which the probability of the estimated noise power exceeding that limit during the observation period is below a low threshold $\epsilon$.

In other words, to estimate the noise, instead of calculating an average value, a histogram of noise levels is considered and the spread of the noise levels is determined.

In the simplest case, the highest noise level over a suitably long observation period is chosen, for example a period of the order of one second.

The noise level can also be estimated as a function of known parameters of the noise. For example, if it is known that the noise is Gaussian noise, the average $\mu$ and the variance $\sigma^2$ of the distribution are calculated and the smoothed value is $\mu+n\sigma$, where $\sigma$ is a standard deviation and n is an integer such that the probability of the noise power not exceeding the value µ+nσ is less than the low threshold ϵ.

More generally, the average and the variance, i.e. the moments of the distribution, are used to estimate the noise power.

Statistical smoothing of the estimate is particularly beneficial in the event of jamming.

It is also possible to use a low-pass finite or infinite impulse response noise filter, for example in the presence of thermal noise.

The present invention applies primarily to estimating the signal-to-noise ratio of a wanted signal, i.e. of a data signal.

The present invention provides a method of estimating the signal-to-noise ratio of a wanted signal, in particular a digital signal, received by a radiocommunications receiver. The method is characterized in that, to minimize the estimation noise of the signal-to-noise ratio, the signal and the noise are estimated separately and the signal and the noise are filtered separately before division of the signal by the noise.

In an embodiment the filtering of the wanted signal is different from the filtering of the noise signal.

In an embodiment, to filter the noise signal, the statistical distribution of the noise power measurements is observed for a particular period during which a statistically representative number of measurement samples is collected and which is sufficiently short for the noise to remain practically stationary.

In another embodiment the noise level used has a value such that the probability that the noise level exceeds that value is less than a predetermined threshold during the observation period.

In an embodiment the noise value used is the maximum value over the particular period.

In an embodiment the moments of the distribution are determined.

In an embodiment the average and the variance of the distribution are determined and the noise value used is µ+nσ, where σ is a standard deviation and n is a number determined according to the predetermined threshold.

In an embodiment a finite or infinite impulse response low-pass filter is used to filter the noise signal.

In an embodiment a finite impulse response filter is used to filter the wanted signal.

In an embodiment the finite impulse response filter is an averaging filter.

In an embodiment the transmitter delivers a reference signal with a regular period at a particular level and the signal-to-noise ratio is estimated from that reference signal.

In an embodiment an infinite impulse response filter is used to filter the estimate of the wanted signal.

In an embodiment a first order auto-regressive filter is used, for example, as expressed by the equation:

$$\hat{x}_i = (1-a)\tilde{x}_i + a\hat{x}_{i-1}$$

where $\tilde{x}_i$ represents the instantaneous estimate of the wanted signal at time $i$, $\hat{x}_i$ represents the smoothed estimate of the wanted signal at time $i$ and $a$ is an integration coefficient.

In an embodiment packets or cells are received sporadically and each packet or cell received is filtered.

The invention also provides an application of the method according to the invention to estimating the signal-to-noise ratio in a telecommunications receiver sending data for controlling the power of a corresponding transmitter.

BRIEF DESCRIPTION OF THE DRAWINGS

Other features and advantages of the invention will become apparent on reading the following description of embodiments of the invention, which description is given with reference to the accompanying drawings, in which.

DETAILED DESCRIPTION OF THE INVENTION

Figure 1:
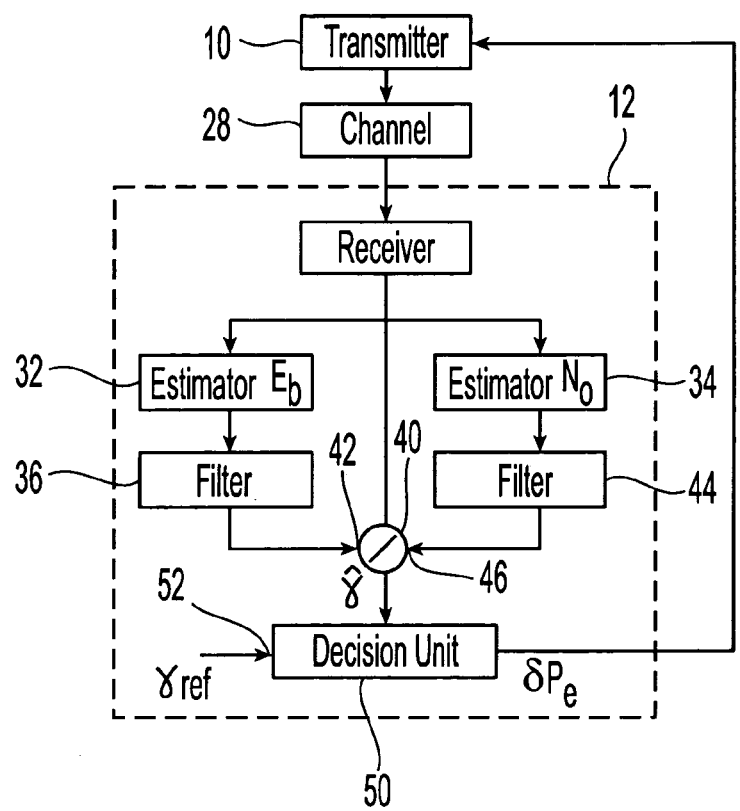
FIG. 1 is a diagram of a transmitter and a receiver using the method according to the invention.

FIG. 1 shows a transmitter 10 and a receiver 12. The power $P_e$ of the transmitter 10 is determined by a set point signal $\delta P_e$ supplied by the receiver 12.

In the example, the transmitter and the receiver are parts of a telecommunications system in which calls are transmitted via non-geostationary satellites 14 (FIG. 2) in low or medium Earth orbit, at an altitude of the order of 1 450 km in the example. The Earth is divided into areas 16 each of which is 700 km in diameter, for example, and each area 16 includes a control or connection station 18, which is centrally located therein, for example, and a plurality of terminals $20_1$, $20_2$, etc. The connection station 18 is connected to one or more other networks 22, for example terrestrial networks.

A call between two terminals $20_1$ and $20_2$ is effected via the satellite 14 and the station 18. To be more precise, when the terminal $20_1$ is communicating with the terminal $20_2$, the signal transmitted by the terminal $20_1$ is transmitted to the station 18 via the satellite 14 and the station 18 forwards the signal to the terminal $20_2$, also via the satellite 14. By "satellite" is meant the retransmission means on board the satellite, of course.

Likewise, a call between a terminal $20_1$ and a subscriber of the network 22 is effected via the station 18. In other words, when a subscriber of the network 22 calls the subscriber $20_1$, the signal is transmitted to the station 18 which transmits it to the terminal 20 via the satellite 14.

Each terminal is simultaneously a transmitter and a receiver and the connection station 18 also transmits and receives simultaneously. Thus, in FIG. 1, the transmitter 10 is either in a terminal or in the connection station 18 and the receiver 12 is likewise in the station 18 or in a terminal $20_i$.

A signal transmitted by the transmitter 10 propagates in space, which constitutes a channel 28 (FIG. 10) which attenuates the signal and introduces noise.

In the conventional way, the receiver 12 includes a receiver unit 30, a unit 32 for estimating the power $E_b$ of the signal and a unit 34 for estimating the power $N_0$ of the noise.

In the invention, the signal estimator unit 32 is followed by a signal filter unit 36 downstream of a divider 40. In other words, the output of the unit 36 is connected to the numerator input 42 of the divider 40.

The noise power $N_0$ estimator unit 34 is followed by a filter 44 downstream of the divider 40 whose output is connected to the denominator input 46 of the divider 40.

The divider 40 supplies an estimate of the signal-to-noise ratio to a decision unit 50 which has an input 52 to which a reference signal $y_{ref}$ is applied. The signal supplied by the divider 40 and the reference signal applied to the input 52 are compared to generate a set point $\delta P_e$ for adjusting the power of the transmitter 10.

As an alternative to this (not shown), the decision unit is in the transmitter and the receiver transmits the signal-to-noise ratio (the output from the divider 40) to a control input of the transmitter.

Consider first the situation in which the transmitter 10 is in the connection station 18 and the receiver 12 is in a terminal $20_i$. In this situation, measuring the signal-to-noise ratio is facilitated by the transmission of a periodic reference signal from the station 18 to the terminals $20_i$. This is a synchronization signal of particular level and known period. Accordingly, in this case, the receiver 12 can use the synchronization signal to measure the signal-to-noise ratio, instead of using the wanted signals, which are by nature sporadic.

In this case, the filter 36 for the wanted signal can be a simple averaging circuit performing the following operation:

$$\hat{x}_i = \frac{1}{L}\sum_{j=0}^{L-1} \tilde{x}_{i-j}$$

where $\tilde{x}_i$ represents the instantaneous estimate of $E_b$ at time i$\hat{x}_i$ represents the smoothed estimate of $E_b$ at time i and L is the integration length.

In this example, the filter 44 samples the noise signal $N_0$ with a period of 1.5 ms over a time period of a few seconds and takes the maximum value observed during that time period.

As an alternative to this, over a particular time period T, chosen to be sufficiently long to collect a sufficient number of measured values but sufficiently short to guarantee stationary noise behavior, the parameters associated with the distribution (histogram) of the noise samples are calculated to deduce therefrom a noise level $\mu_{N0}+\Delta_{N0}$ such that the probability that the instantaneous noise value exceeds that level is less than $\epsilon$, in other words:

$$P(\forall i \in ([O,T], \tilde{N}_0(i) > \mu_{N0}+\Delta_{N0}) < \epsilon$$

In the above equation, $\tilde{N}_0(i)$ represents the value of a noise sample of the distribution at time $t_i$, T the observation period and $\mu_{N0}$ the average value of the noise signal.

Figure 3:
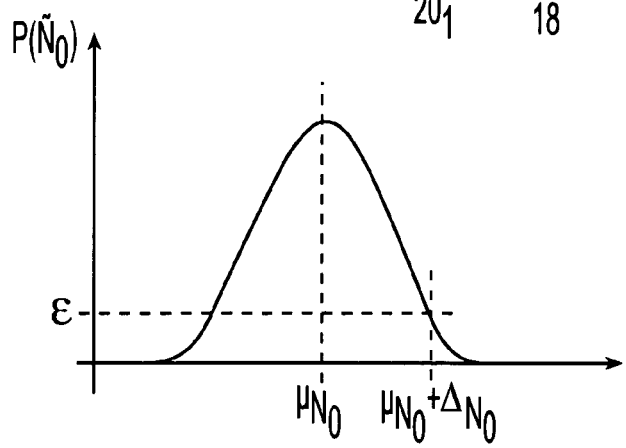
FIG. 3 is a diagram explaining some aspects of the filtering used in the receiver, shown in FIG. 1.

The above equation is represented by the FIG. 3 diagram, in which the instantaneous noise levels $\tilde{N}_0$ are plotted on the abscissa axis and the probability $p(\tilde{N}_0)$ of appearance of those levels on the ordinate axis.

The value adopted $\mu_{N0}+\Delta_{N0}$ can be calculated using moments of the distribution, in particular the average $\mu$ and the variance $\sigma^2$. In this latter case, the smoothed value is $\mu+n\sigma$, for example, where $\sigma$ is a standard deviation and n is an integer chosen according to the value of $\epsilon$ adopted.

Then consider the situation in which the transmitter 10 is in a terminal and the receiver is in the connection station 18. In this case, the terminal does not send any periodic reference signal to the connection station, only sporadic data signals in the form of cells or packets, and the signal power $E_b$ is estimated in the receiver for each packet or cell. The noise can be estimated with a regular period, as in the previous situation.

Accordingly, in this case, the filtering 44 of the noise is effected in the same manner as under the previous hypothesis. On the other hand, it is preferable to allow for the sporadic nature of the transmission in smoothing or filtering the signal (36). A first order auto-regressive filter is used to perform the following operation, for example:

$$\hat{x}_i = (1-a)\tilde{x}_i + a\tilde{x}_{i-1}$$

where $\tilde{x}_i$ represents the instantaneous estimate of $E_b$ at time i, $\hat{x}_i$ represents the smoothed estimate of $E_b$ at time i and a is an integration coefficient.

A filter of the above kind is better suited to the sporadic nature than an average because, as shown by the preceding equation, it gives more weight to more recent data than to less recent data.

The method according to the invention provides an estimate of the signal-to-noise ratio of the received signal enabling a set point to be applied to the transmitter. It is therefore possible to minimize the power transmitted whilst conforming to a bit error rate that does not exceed a prescribed threshold.

Figure 2:
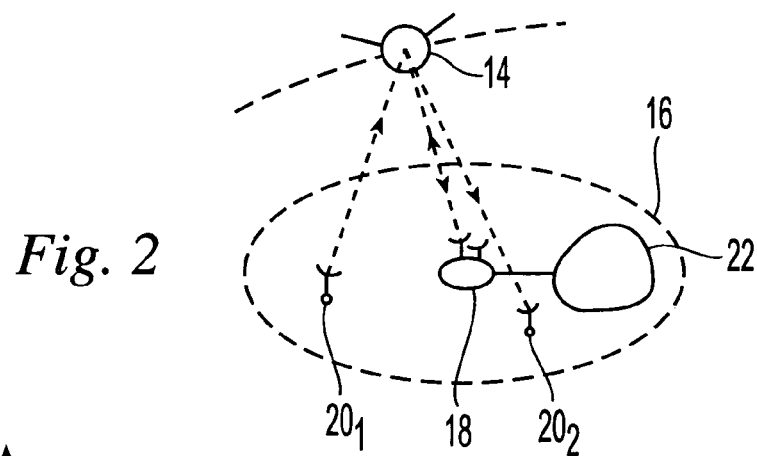
FIG. 2 is a diagram of a telecommunications system to which the method according to the invention is applied.

The above statistical processing of the noise is particularly beneficial and efficient in a situation in which the telecommunications system shown in FIG. 2 has two adjoining areas 16 using the same carrier frequency. In this case there is a risk of jamming in neighboring or non-neighboring parts of the two areas and therefore of unpredictable noise in those parts.

What is claimed is:

1. A method of estimating a signal-to-noise ratio of a digital signal received by a radiocommunications receiver, the method comprising:

estimating separately a wanted signal and a noise signal of the digital signal;

filtering separately the wanted signal and the noise signal; and determining the signal-to-noise ratio by dividing the wanted signal which has been filtered by the noise signal which has been filtered, wherein the filtering of the noise signal comprises determining a noise value which is used to determine the signal-to-noise ratio based on a statistical distribution of noise power measurement samples for a predetermined period during which a statistically representative number of the noise power measurement samples is collected and wherein the predetermined period is sufficiently short for the noise signal to remain practically stationary, wherein a first order auto-regressive infinite impulse response filter is used to filter the wanted signal as expressed by the equation:

$$\hat{x}_i = (1-a)\tilde{x}_i + a\tilde{x}_{ii-1}$$

where $\tilde{x}_i$ represents an instantaneous estimate of the wanted signal at time i, $\hat{x}_i$ represents a smoothed estimate of the wanted signal at time i and a is an integration coefficient.

2. A method according to claim 1, wherein the filtering of the wanted signal is different from the filtering of the noise signal.

3. A method according to claim 1, wherein the noise value is determined such that a probability that an instantaneous noise level exceeds the noise value is less than a predetermined threshold during the predetermined period.

4. A method according to claim 1, wherein the noise value used to determine the signal-to-noise ratio is a maximum value of the noise power measurement samples over the predetermined period.

5. A method according to claim 1, wherein moments of the statistical distribution are determined.

6. A method according to claim 5, wherein an average $\mu$ and a variance $\sigma^2$ of the statistical distribution are determined in that the noise value used is $\mu+n\sigma$, where $\sigma$ is a standard deviation and n is a number determined according to a predetermined threshold.

7. A method according to claim 1, wherein a finite or infinite impulse response low-pass filter is used to filter the noise signal.

8. A method according to claim 1, wherein a transmitter provides a reference signal with a regular period at a particular level and the reference signal is utilized as the wanted signal to estimate the signal-to-noise ratio.

9. A method according to claim 1, wherein packets or cells of the digital signal are received sporadically and each packet or cell received is filtered.

10. A method according to claim 1, further comprising the signal-to-noise ratio controlling a transmit power of a corresponding transmitter based on.

* * * * *